(12) United States Patent
Stark et al.

(10) Patent No.: US 10,954,938 B2
(45) Date of Patent: Mar. 23, 2021

(54) VALVE SEATS AND VALVE ASSEMBLIES FOR FLUID END APPLICATIONS

(71) Applicant: Kennametal Inc., Latrobe, PA (US)

(72) Inventors: Roger M. Stark, Jefferson Hills, PA (US); Carrie Bartkowiak, Traverse City, MI (US); John Brosnahan, North Huntingdon, PA (US); Michael Kelly, Anaheim, CA (US)

(73) Assignee: KENNAMETAL INC., Latrobe, PA (US)

( * ) Notice: Subject to any disclaimer, the term of this patent is extended or adjusted under 35 U.S.C. 154(b) by 46 days.

(21) Appl. No.: 16/408,822

(22) Filed: May 10, 2019

(65) Prior Publication Data

US 2019/0264682 A1    Aug. 29, 2019

Related U.S. Application Data

(63) Continuation of application No. 15/875,758, filed on Jan. 19, 2018, now Pat. No. 10,344,757.

(51) Int. Cl.
*F04B 53/10* (2006.01)
*F04B 53/16* (2006.01)
(Continued)

(52) U.S. Cl.
CPC ........ *F04B 53/1087* (2013.01); *F04B 1/0452* (2013.01); *F04B 39/10* (2013.01);
(Continued)

(58) Field of Classification Search
CPC .... F04B 53/1087; F04B 1/0452; F04B 39/10; F04B 53/16; F04B 37/12; F16K 25/005;
(Continued)

(56) References Cited

U.S. PATENT DOCUMENTS 1,478,673 A ‡ 12/1923 Parker
2,103,503 A ‡ 12/1937 White ................ F04B 53/1027
137/32

(Continued)

FOREIGN PATENT DOCUMENTS

CN    2861553 Y  ‡  1/2007
CN    2861553 Y     1/2007
(Continued)

OTHER PUBLICATIONS

SPM 2.0 Valve and Seat.
(Continued)

*Primary Examiner* — Marina A Tietjen
(74) *Attorney, Agent, or Firm* — Larry R. Meenan (57) ABSTRACT

In one aspect, valve seats are described herein having structure and design addressing degradative stresses encountered by valve seats during installation and operation in fluid ends. In some embodiments, a valve seat for use in a fluid end comprises a first section for insertion into a fluid passageway of the fluid end and a second section extending longitudinally from the first section, the second section has an outer diameter greater than the outer diameter of the first section. The second section also comprises a frusto-conical valve mating surface, wherein the second section is encased in a ring imparting a compressive stress condition to the second section.

18 Claims, 8 Drawing Sheets

(51) Int. Cl.
*F04B 39/10* (2006.01)
*F16K 25/00* (2006.01)
*F16K 17/04* (2006.01)
*F04B 1/0452* (2020.01)
*F16K 1/42* (2006.01)
*C22C 29/06* (2006.01)
*F04B 37/12* (2006.01)
*C22C 29/08* (2006.01)
*C22C 19/05* (2006.01)
*F04B 15/02* (2006.01)

(52) U.S. Cl.
CPC ............ *F16K 1/42* (2013.01); *F16K 17/0466* (2013.01); *F16K 25/005* (2013.01); *C22C 19/055* (2013.01); *C22C 29/067* (2013.01); *C22C 29/08* (2013.01); *F04B 15/02* (2013.01); *F04B 37/12* (2013.01); *F04B 53/16* (2013.01)

(58) Field of Classification Search
CPC ........ F16K 17/0466; B22F 5/106; B22F 7/08; C22C 29/067; C22C 29/08; C22C 19/055
See application file for complete search history.

(56) References Cited

U.S. PATENT DOCUMENTS

| | | | |
|---|---|---|---|
| 2,745,631 A ‡ | 5/1956 | Shellman | F04B 53/1027 137/54 |
| 2,969,951 A ‡ | 1/1961 | Walton | F04B 53/1027 137/54 |
| 2,982,515 A ‡ | 5/1961 | Rule | F61K 1/465 251/33 |
| 3,063,467 A ‡ | 11/1962 | Roberts, Jr. | F16K 1/465 137/51 |
| 4,076,212 A ‡ | 2/1978 | Leman | F16K 1/46 137/51 |
| 4,425,699 A ‡ | 1/1984 | Nordin | B21K 25/00 277/399 |
| 4,572,298 A ‡ | 2/1986 | Weston | E21B 29/04 137/625.48 |
| 4,911,410 A ‡ | 3/1990 | Baker | E21B 29/04 251/1.3 |
| 4,951,707 A ‡ | 8/1990 | Johnson | F04B 53/1025 137/51 |
| 4,997,162 A ‡ | 3/1991 | Baker | E21B 29/04 251/1.3 |
| 5,002,834 A ‡ | 3/1991 | Smith et al. | |
| 5,062,450 A ‡ | 11/1991 | Bailey | E21B 33/13 137/51 |
| 5,249,600 A ‡ | 10/1993 | Blume | F04B 53/1087 137/51 |
| 5,275,204 A ‡ | 1/1994 | Rogers | F04B 53/1027 137/51 |
| 5,345,965 A ‡ | 9/1994 | Blume | F04B 53/1027 137/51 |
| 5,501,424 A ‡ | 3/1996 | Williams | E21B 29/04 251/1.3 |
| 6,139,599 A | 10/2000 | Takahashi et al. | |
| 6,382,940 B1 ‡ | 5/2002 | Blume | F04B 53/007 277/43 |
| 6,464,749 B1 | 10/2002 | Kawase et al. | |
| 6,641,779 B2 ‡ | 11/2003 | Kawase et al. | |
| 6,712,871 B2 ‡ | 3/2004 | Oh | |
| 6,802,883 B2 ‡ | 10/2004 | Henmi et al. | |
| 6,916,444 B1 ‡ | 7/2005 | Liang | |
| 6,951,579 B2 ‡ | 10/2005 | Koyama | |
| 6,955,181 B1 ‡ | 10/2005 | Blume | F16K 1/38 137/15 |
| 7,070,166 B1 ‡ | 7/2006 | Blume | F04B 53/102 251/359 |
| 7,273,508 B2 ‡ | 9/2007 | Sato et al. | |
| 7,478,673 B2 | 1/2009 | Boyd | |
| 7,540,470 B1 ‡ | 6/2009 | Blume | F04B 53/102 137/15.18 |
| 7,572,312 B2 ‡ | 8/2009 | Kawata et al. | |
| D607,091 S ‡ | 12/2009 | Weston | |
| 7,661,935 B2 ‡ | 2/2010 | Kellar | F04B 1/0408 417/27 |
| D614,271 S ‡ | 4/2010 | Weston | |
| 7,726,026 B1 ‡ | 6/2010 | Blume | F04B 53/102 251/359 |
| 7,730,905 B2 | 6/2010 | Suzuki | |
| 8,210,542 B1 ‡ | 7/2012 | Gilstad | F16J 15/324 277/53 |
| 8,221,517 B2 ‡ | 7/2012 | Mirchandani | C22C 29/00 75/246 |
| 8,317,498 B2 | 11/2012 | Gambier et al. | |
| D700,682 S ‡ | 3/2014 | Bayyouk | D23/23 |
| 8,707,853 B1 ‡ | 4/2014 | Dille | F04B 53/14 92/165 |
| 8,790,439 B2 ‡ | 7/2014 | Mirchandani | C22C 29/00 75/247 |
| 8,844,903 B2 ‡ | 9/2014 | Takahashi et al. | |
| 8,870,554 B2 | 10/2014 | Kent | |
| 8,915,722 B1 ‡ | 12/2014 | Blume | F04B 53/007 137/543.23 |
| 9,169,707 B1 ‡ | 10/2015 | Gilstad | E21B 28/00 |
| 9,175,584 B2 ‡ | 11/2015 | Lee et al. | |
| 9,222,154 B2 ‡ | 12/2015 | Dolman | |
| D748,228 S ‡ | 1/2016 | Bayyouk | D23/26 |
| 9,273,385 B2 ‡ | 3/2016 | Dolman | |
| D754,817 S ‡ | 4/2016 | Dille | D23/23 |
| 9,359,921 B2 ‡ | 6/2016 | Hashimoto et al. | |
| 9,435,454 B2 ‡ | 9/2016 | Blume | |
| 9,581,056 B2 ‡ | 2/2017 | Koyama et al. | |
| 9,631,739 B2 ‡ | 4/2017 | Belshan | F16K 31/12 |
| D796,632 S ‡ | 9/2017 | Bayyouk | D23/23 |
| D802,104 S ‡ | 11/2017 | Nagahamaya | D23/26 |
| 9,822,894 B2 ‡ | 11/2017 | Bayyouk | F16K 25/005 |
| 9,849,532 B2 ‡ | 12/2017 | Zheng et al. | |
| 9,927,036 B2 ‡ | 3/2018 | Dille | |
| 2004/0234404 A1 ‡ | 11/2004 | Vicars | F04B 53/102 417/57 |
| 2007/0095443 A1 | 5/2007 | Dolman | |
| 2009/0278069 A1 ‡ | 11/2009 | Blanco | F16K 15/063 251/30 |
| 2011/0079302 A1 ‡ | 4/2011 | Hawes | F16K 25/005 137/53 |
| 2011/0278490 A1 ‡ | 11/2011 | Maruno | B23K 20/122 251/359 |
| 2012/0286183 A1 ‡ | 11/2012 | McCarty | F16K 1/48 251/357 |
| 2013/0017108 A1 | 1/2013 | Kellar et al. | |
| 2013/0020521 A1 ‡ | 1/2013 | Byrne | F16K 1/385 251/33 |
| 2013/0037179 A1 | 2/2013 | Dolman | |
| 2013/0181154 A1 ‡ | 7/2013 | Robison | F16K 5/08 251/324 |
| 2013/0202458 A1 ‡ | 8/2013 | Byrne | F04B 7/02 417/27 |
| 2013/0259733 A1 | 10/2013 | Lee et al. | |
| 2013/0269647 A1 | 10/2013 | Pandey | |
| 2013/0319220 A1 | 12/2013 | Luharuka et al. | |
| 2014/0070127 A1 | 3/2014 | Blume | |
| 2014/0124692 A1 ‡ | 5/2014 | Baumann | F16K 1/38 251/332 |
| 2015/0144826 A1 | 5/2015 | Bayyouk et al. | |
| 2015/0219096 A1 | 8/2015 | Jain et al. | |
| 2016/0101600 A1 | 4/2016 | Potts et al. | |
| 2016/0238156 A1 ‡ | 8/2016 | Hubenschmidt | F16K 37/0008 |
| 2017/0009890 A1 ‡ | 1/2017 | Vu | F16K 1/36 |
| 2017/0059052 A1 ‡ | 3/2017 | Abouelleil | F16K 1/2263 |
| 2017/0067459 A1 ‡ | 3/2017 | Bayyouk | B23P 6/00 |
| 2017/0089228 A1 ‡ | 3/2017 | Shimada | C22C 38/42 |
| 2017/0145875 A1 ‡ | 5/2017 | Hashimoto | C22C 9/00 |
| 2017/0298932 A1 ‡ | 10/2017 | Wagner | F04B 53/1087 |

(56) References Cited

U.S. PATENT DOCUMENTS

| | | | |
|---|---|---|---|
| 2017/0341148 A1 | 11/2017 | Faust et al. | |
| 2018/0290933 A1* | 10/2018 | Shetty | C22C 29/02 |

FOREIGN PATENT DOCUMENTS

| | | | | |
|---|---|---|---|---|
| CN | 101737317 A ‡ | 6/2010 | | |
| CN | 101737317 A | 6/2010 | | |
| CN | 202001288 U ‡ | 10/2011 | | |
| CN | 202001288 U | 10/2011 | | |
| CN | 106996368 A ‡ | 8/2017 | | |
| CN | 106996368 A | 8/2017 | | |
| GB | 855956 A ‡ | 12/1960 | | F04B 53/1025 |
| GB | 855956 A | 12/1960 | | |
| NL | 1020775 C2 ‡ | 12/2003 | | F04B 53/102 |
| NL | 1020775 C2 | 12/2003 | | |
| WO | 2015077001 A1 | 5/2015 | | |
| WO | WO-2015077001 A1 ‡ | 5/2015 | | F04B 47/00 |
| WO | WO-WG2015077001 A1 ‡ | 5/2015 | | |
| WO | 2016201020 A1 | 1/2016 | | |
| WO | WO-2016118879 A1 * | 7/2016 | | C22C 29/02 |
| WO | WO-2016201020 A1 ‡ | 12/2016 | | F04B 47/02 |

OTHER PUBLICATIONS

Jun. 15, 2018 Office action (3 months) (US Only) U.S. Appl. No. 10/391,557.
Oct. 9, 2018 Office action (3 months) (US Only) U.S. Appl. No. 10/344,757.
Dec. 17, 2018 Notice of Allowance U.S. Appl. No. 10/391,557.
Apr. 10, 2019 Notice of Allowance U.S. Appl. No. 10/391,557.
Apr. 10, 2019 Notice of Allowance U.S. Appl. No. 10/344,757.
Mar. 30, 2020 Non-Final OA.

\* cited by examiner
‡ imported from a related application

VALVE SEATS AND VALVE ASSEMBLIES FOR FLUID END APPLICATIONS

RELATED APPLICATION DATA

The present application is a continuation application pursuant to 35 U.S.C. § 120 of U.S. patent application Ser. No. 15/875,758 filed Jan. 19, 2018.

FIELD

The present invention relates to valve seats and valve assemblies for fluid end applications and, in particular, to valve seats comprising sintered cemented carbide components.

BACKGROUND

Valves and associated valve assemblies play a critical role in fluid ends of high pressure pumps incorporating positive displacement pistons in multiple cylinders. Operating environments of the valves are often severe due to high pressures and cyclical impact between the valve body and the valve seat. These severe operating conditions can induce premature failure and/or leakage of the valve assembly. Moreover, fluid passing through the fluid end and contacting the valve assembly can include high levels of particulate matter from hydraulic fracturing operations. In hydraulic fracturing, a particulate slurry is employed to maintain crack openings in the geological formation after hydraulic pressure from the well is released. In some embodiments, alumina particles are employed in the slurry due to higher compressive strength of alumina relative to silica particles or sand. The particulate slurry can impart significant wear on contact surfaces of the valve and valve seat. Additionally, slurry particles can become trapped in the valve sealing cycle, resulting in further performance degradation of the valve assembly.

In view of these problems, valve seats have been fabricated from a variety of hard and wear resistant materials, including cemented carbide. While exhibiting high hardness and wear resistance, carbide valve seats can undergo occasional catastrophic failure due to stresses induced in the carbide from installation and removal forces, application loading and the press fit with the fluid end.

SUMMARY

In one aspect, valve seats are described herein having structure and design addressing degradative stresses encountered by the seats during installation and operation in fluid ends. In some embodiments, a valve seat for use in a fluid end comprises a first section for insertion into a fluid passageway of the fluid end and a second section extending longitudinally from the first section, the second section having an outer diameter greater than the outer diameter of the first section. The second section also comprises a frusto-conical valve mating surface, wherein the second section is encased in a ring imparting a compressive stress condition to the second section. In some embodiments, the second section is at least partially formed of sintered cemented carbide.

In another aspect, a valve seat comprises a first section for insertion into a fluid passageway of a fluid end and a second section extending longitudinally from the first section, the second section having an outer diameter greater than the outer diameter of the first section. The second section also includes a frusto-conical valve mating surface comprising sintered cemented carbide having surface roughness ($R_a$) of 1-15 µm. In some embodiments, the sintered cemented carbide of the valve mating surface is provided as an inlay ring coupled to a metal or alloy body. In other embodiments, the second section is formed of the sintered cemented carbide.

In another aspect, valve assemblies for use in fluid ends are provided. A valve assembly comprises a valve in reciprocating contact with a valve seat, the valve seat comprising a first section for insertion into a fluid passageway of the fluid end and a second section extending longitudinally from the first section. The second section has an outer diameter greater than the outer diameter of the first section and comprises a frusto-conical valve mating surface. The second section is also encased in a ring which imparts a compressive stress condition to the second section. In some embodiments, the second section is optionally encased in the ring, and the valve mating surface comprises sintered cemented carbide having surface roughness ($R_a$) of 1-15 µm. In other embodiments, the frusto-conical valve mating surface of the second section is provided as a sintered cemented carbide inlay coupled to a metal or alloy body, wherein the sintered cemented carbide has surface roughness ($R_a$) of 1-15 µm.

In a further aspect, fluid ends are described. A fluid end comprises a suction fluid passageway and a discharge fluid passageway. A valve assembly is positioned in at least one of the suction and discharge fluid passageways, the valve assembly comprising a valve in reciprocating contact with a valve seat. The valve seat comprises a first section for insertion into the suction or discharge fluid passageway and a second section extending longitudinally from the first section. The second section has an outer diameter greater than the outer diameter of the first section and comprises a frusto-conical valve mating surface. The second section is encased in a ring which imparts a compressive stress condition to the second section. In some embodiments, the second section is optionally encased in the ring, and the valve mating surface comprises sintered cemented carbide having surface roughness ($R_a$) of 1-15 µm. In other embodiments, the frusto-conical valve mating surface of the second section is provided as a sintered cemented carbide inlay coupled to a metal or alloy body, wherein the sintered cemented carbide has surface roughness ($R_a$) of 1-15 µm.

These and other embodiments are further described in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

Figure 1:
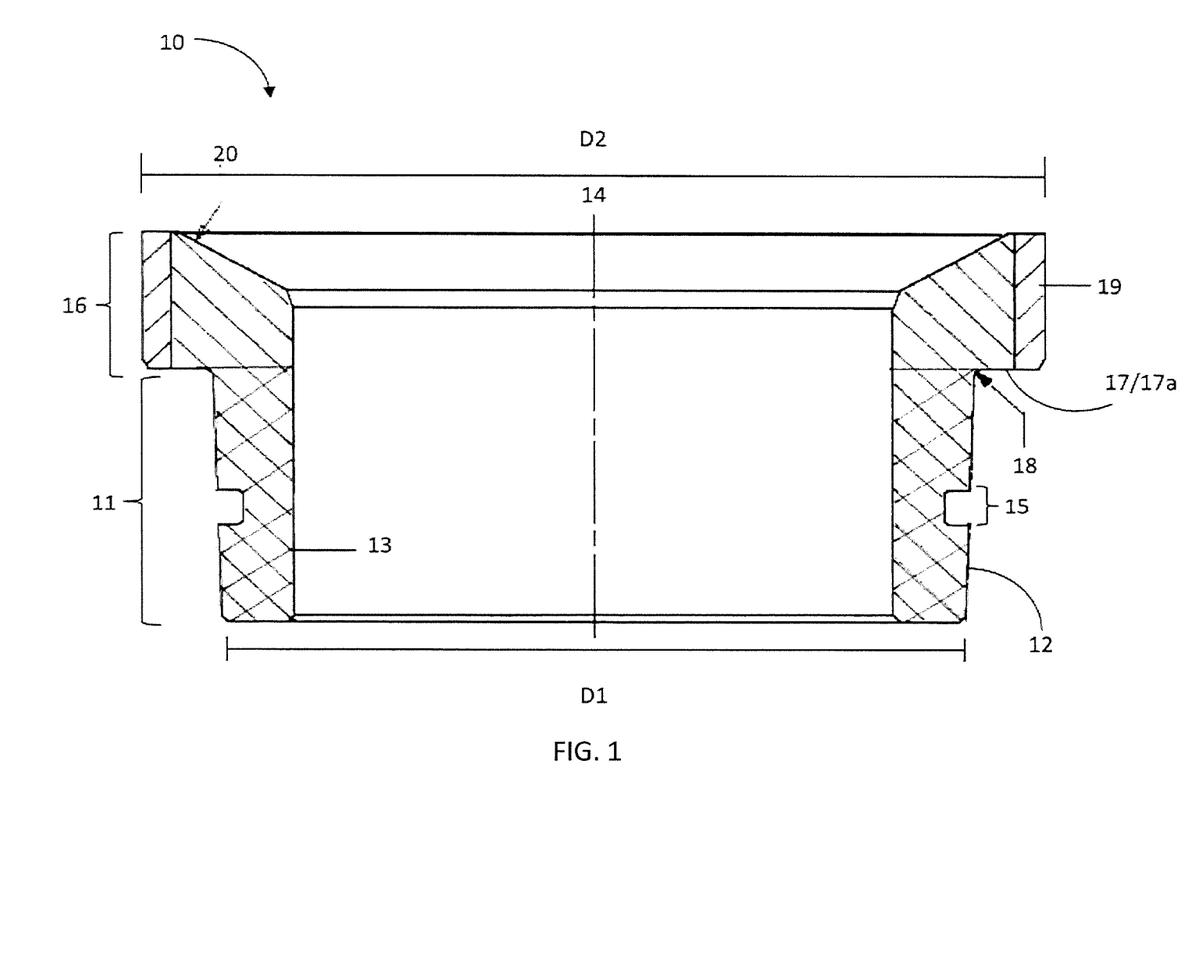
FIG. 1 is a cross-sectional schematic of a valve seat according to some embodiments.

In one aspect, valve seats for fluid end applications are described herein. In some embodiments, the valve seats can mitigate the severe operating conditions of hydraulic fracturing applications, leading to enhanced lifetimes and reductions in sudden seat failure. Referring now to FIG. 1, a valve seat 10 comprises a first section 11 for insertion into a fluid passageway of the fluid end. In the embodiment of FIG. 1, the first section 11 comprises a tapered outer surface 12 and an inner surface 13 that is generally parallel to the longitudinal axis 14 of the seat 10. In some embodiments, the inner surface 13 may also be tapered. The tapered outer surface 12 can present a variable outer diameter D1 of the first section 11. Alternatively, the outer surface 12 of the first section 11 is not tapered and remains parallel to the longitudinal axis 14. In such an embodiment, the first section 11 has a static outer diameter D1. The outer surface 12 of the first section may also comprise one or more recesses 15 for receiving an O-ring. One or more O-rings can aid in sealing with the fluid passageway wall.

A second section 16 is extends longitudinally from the first section 11. The second section has an outer diameter D2 that is larger than outer diameter D1 of the first section 11. A shoulder 17 is formed by the larger outer diameter D2 of the second section 16. In the embodiment of FIG. 1, the shoulder surface 17a is generally normal to the longitudinal axis 14 of the valve seat 10. In other embodiments, the shoulder surface 17a can taper and/or form an angle with the longitudinal axis having a value of 5-70 degrees. Design of the shoulder 17 can be selected according to several considerations including, but not limited to, entrance geometry of the fluid passageway and pressures experienced by the seat when in operation. In some embodiments, for example, taper of the shoulder can be set according to curvature of the fluid passageway entrance engaging the shoulder. The first section 11 transitions to the second section 16 at a curved intersection 18. The curved intersection can have any desired radius. Radius of the curved intersection, in some embodiments, can be 0.05 to 0.5 times the width of the shoulder. In other embodiments, a curved transition is not present between the first and second sections.

The second section 16 also comprises a frusto-conical valve mating surface 20, wherein the second section 16 is encased by a ring 19. In the embodiment of FIG. 1, the ring 19 is coupled to the outer surface of the second section 16 in a concentric arrangement. The ring 19 imparts a compressive stress condition to the second section 16. By placing the second section 16 in compressive stress, the ring 19 can assist in balancing or equalizing stress between the first section 11 and second section 16 when the first section 11 is press fit into a fluid passageway of the fluid end. A compressive stress condition can also inhibit crack formation and/or propagation in the second section 16, thereby enhancing lifetime of the valve seat and reducing occurrences of sudden or catastrophic seat failure. A compressive stress condition may also enable the use of harder and more brittle materials in the second section 16, such as harder and more wear resistant grades of cemented carbide forming the valve mating surface.

In the embodiment of FIG. 1, the ring 19 forms a planar interface with the outer surface or perimeter of the second section 16. In other embodiments, the ring 19 may comprise one or more protrusions or flanges residing on the inner annular surface of the ring 19. A protrusion or flange on the inner ring surface may fit into a recess or groove along the perimeter of the second section 16. This structural arrangement can assist in proper engagement between the ring 19 and second section 16. This structural arrangement may also assist in retaining the second section 16 within the ring 19 during operation of the fluid end. In a further embodiment, the second section 16 can comprise one or more protrusions of flanges for engaging one or more recesses in the interior annular surface of the ring 19.

Figure 2:
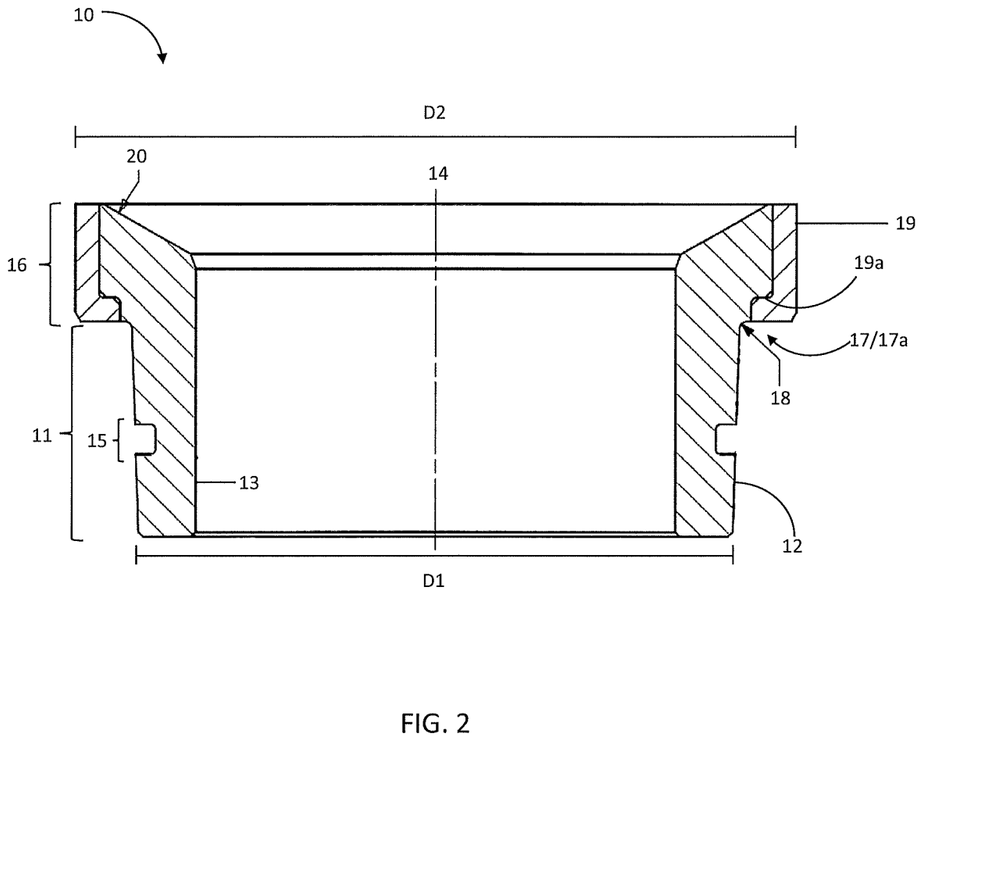
FIG. 2 is a cross-sectional schematic of a valve seat according to some embodiments.
Figure 3:
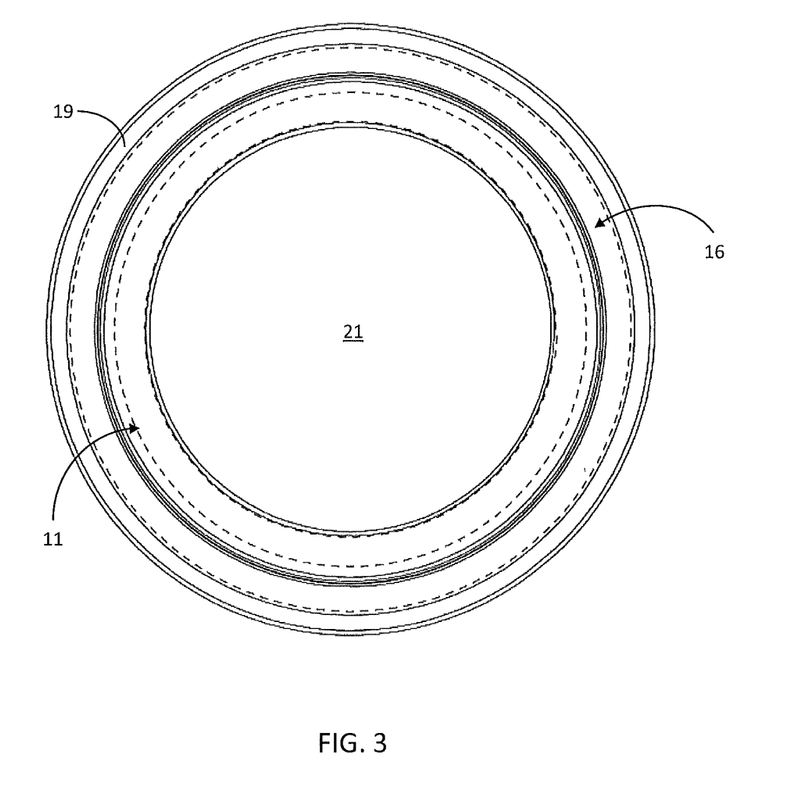
FIG. 3 is a bottom plan view of a valve seat according to some embodiments.
Figure 4:
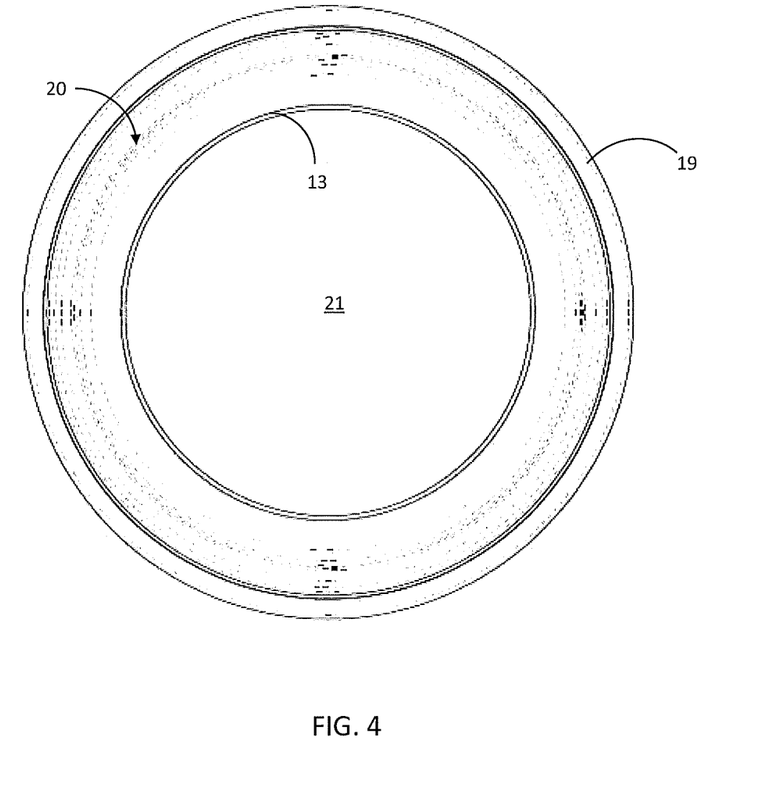
FIG. 4 is a top plan view of a valve seat according to some embodiments.
Figure 5:
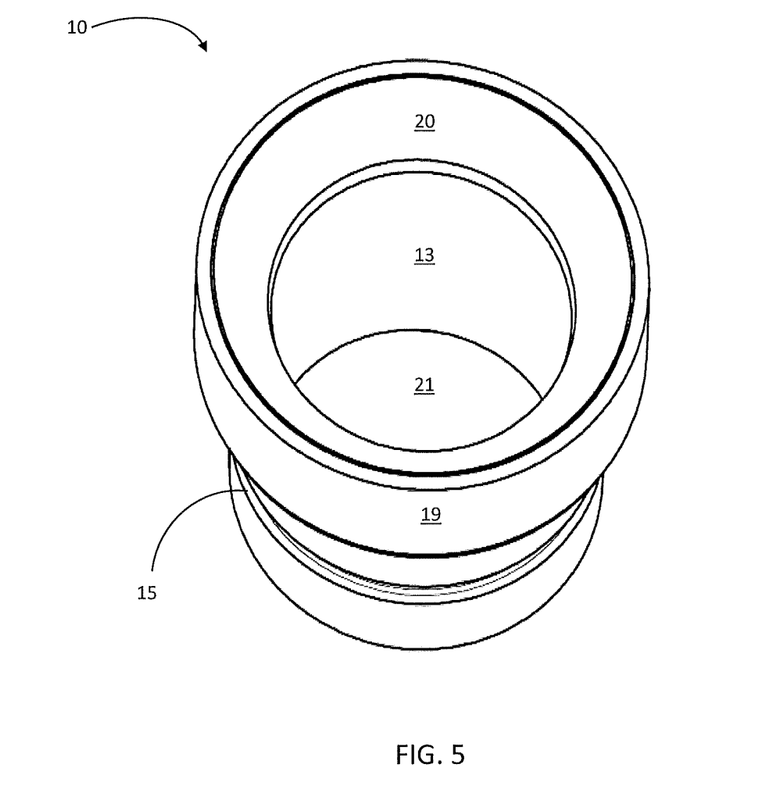
FIG. 5 is a perspective view of a valve seat according to some embodiments.
Figure 6:
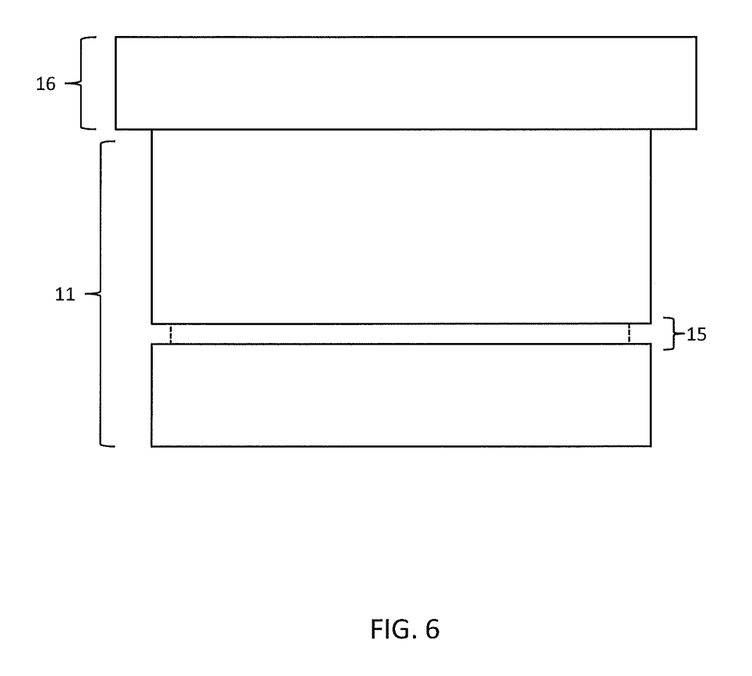
FIG. 6 is a side elevational view of a valve seat according to some embodiments.

FIG. 2 is a schematic illustrating another embodiment of a valve seat described herein. The valve seat of FIG. 2 comprises the same structural features illustrated in FIG. 1. However, the ring 19 in FIG. 2 at least partially covers the shoulder 17. The ring 19, for example, can be provided a radial flange 19a for interfacing the shoulder 17 of the second section 16. In some embodiments, the ring 19 fully covers the shoulder 17. FIG. 3 is a perspective view of a valve seat having the architecture of FIG. 2. As illustrated in FIG. 3, the ring 19 is coupled to the perimeter of the second section and partially covers the shoulder 17. FIG. 4 is another perspective view of a valve seat having the architecture of FIG. 2. The frusto-conical valve mating surface 20 transitions into the bore 21 of the valve seat 10. The ring 19 encases the second section 16, imparting a compressive stress condition to the second section 16. Accordingly, a compressive stress condition is imparted to the valve mating surface 20, which can assist in resisting crack formation and/or crack propagation in the mating surface 20. FIGS. 3 and 4 illustrate bottom and top plan views of the valve seat of FIG. 2 respectively. Moreover, FIG. 5 illustrates a perspective view of the valve seat of FIG. 2. FIG. 6 illustrates a side elevational view of a valve seat according to some embodiments, wherein a curved intersection does not exist between the first section 11 and second section 16.

As described herein, the valve seat can comprise sintered cemented carbide. In some embodiments, the first and second section of the valve seat are each formed of sintered cemented carbide. Alternatively, the first section can be formed of metal or alloy, such as steel or cobalt-based alloy, and the second section is formed of sintered cemented carbide. Forming the second section of sintered cemented carbide can impart hardness and wear resistance to the valve mating surface relative to other materials, such as steel.

In some embodiments, the second section is formed of a composite comprising sintered cemented carbide and alloy. For example, a sintered cemented carbide inlay can be coupled to a steel substrate, wherein the sintered cemented carbide inlay forms a portion or all of the valve mating surface, and the steel substrate forms the remainder of the second section. In such embodiments, the sintered carbide inlay can extend radially to contact the ring encasing the second section, thereby permitting the ring to impart a compressive stress condition to the sintered carbide inlay. In other embodiments, the steel or alloy substrate comprises a recess in which the sintered carbide inlay is positioned. In this embodiment, the outer rim of the recess is positioned between the sintered carbide inlay and ring, wherein compressive stress imparted by the ring is transmitted through the outer rim to the sintered carbide inlay.

Sintered cemented carbide of the valve seat can comprise tungsten carbide (WC). WC can be present in the sintered carbide in an amount of at least 70 weight percent or in an amount of at least 80 weight percent. Additionally, metallic binder of cemented carbide can comprise cobalt or cobalt alloy. Cobalt, for example, can be present in the sintered cemented carbide in an amount ranging from 3 weight percent to 20 weight percent. In some embodiments, cobalt is present in sintered cemented carbide of the valve seat in an amount ranging from 5-12 weight percent or from 6-10 weight percent. Further, sintered cemented carbide valve seat may exhibit a zone of binder enrichment beginning at and extending inwardly from the surface of the substrate. Sintered cemented carbide of the valve seat can also comprise one or more additives such as, for example, one or more of the following elements and/or their compounds: titanium, niobium, vanadium, tantalum, chromium, zirconium and/or hafnium. In some embodiments, titanium, niobium, vanadium, tantalum, chromium, zirconium and/or hafnium form solid solution carbides with WC of the sintered cemented carbide. In such embodiments, the sintered carbide can comprise one or more solid solution carbides in an amount ranging from 0.1-5 weight percent.

In some embodiments, a single grade of sintered cemented carbide can be employed to form the first and second sections of the valve seat. In other embodiments, one or more compositional gradients can exist between sintered cemented carbide of the first section and second section. For example, sintered cemented carbide of the first section may have larger average grain size and/or higher metallic binder content to increase toughness. In contrast, sintered cemented carbide of the second section may have smaller average grain size and less binder for enhancing hardness and wear resistance. Additionally, a compositional gradient can exist within the first and/or second section of the valve seat. In some embodiments, sintered cemented carbide forming the valve mating surface comprises small average grain size and lower metallic binder content for enhancing hardness and wear resistance. Progressing away from the valve mating surface, the sintered cemented carbide composition of the second section can increase in grain size and/or binder content to enhance toughness and fracture resistance. In some embodiments, for example, sintered cemented carbide of high hardness and high wear resistance can extend to a depth of 50 µm-1 mm or 75-500 µm in the second section. Once the desired depth is reached, the sintered cemented carbide composition changes to a tougher, fracture resistant composition.

When the valve mating surface is formed of sintered cemented carbide, the sintered cemented carbide can have surface roughness ($R_a$) of 1-15 µm, in some embodiments. Surface roughness ($R_a$) of the sintered cemented carbide can also be 5-10 µm. Surface roughness of sintered cemented carbide forming the valve mating surface may be obtained via mechanical working including, but not limited to, grinding and/or blasting techniques. Moreover, sintered cemented carbide forming the second section of the valve seat, including the valve mating surface, can exhibit a compressive stress condition of at least 500 MPa. In some embodiments, sintered cemented carbide forming the second section can have a compressive stress condition selected from Table I.

TABLE I

| Sintered Cemented Carbide Compressive Stress (GPa) |
| --- |
| ≥1 |
| ≥1.5 |
| ≥2 |
| 0.5-3 |
| 1-2.5 |

Compressive stress condition of the sintered cemented carbide can result from compression imparted by the ring encasing the second section and/or mechanically working the sintered cemented carbide to provide a valve mating surface of desired surface roughness. Compressive stress of the sintered cemented carbide may be determined via X-ray diffraction according to the $Sin^2 \psi$ method. Sintered cemented carbide of the valve seat may also exhibit hardness of 88-94 HRA.

The ring encasing the second section can be formed of any suitable material operable to impart a compressive stress condition to the second section. In some embodiments, the ring is formed of metal or alloy, such as steel. The ring may also be formed of ceramic or cermet.

In another aspect, a valve seat comprises a first section for insertion into a fluid passageway of a fluid end and a second section extending longitudinally from the first section, the second section having an outer diameter greater than the outer diameter of the first section. The second section also includes a frusto-conical valve mating surface comprising sintered cemented carbide having surface roughness ($R_a$) of 1-15 µm. The second section of the valve seat may optionally be encased by a ring as described herein.

Figure 7:
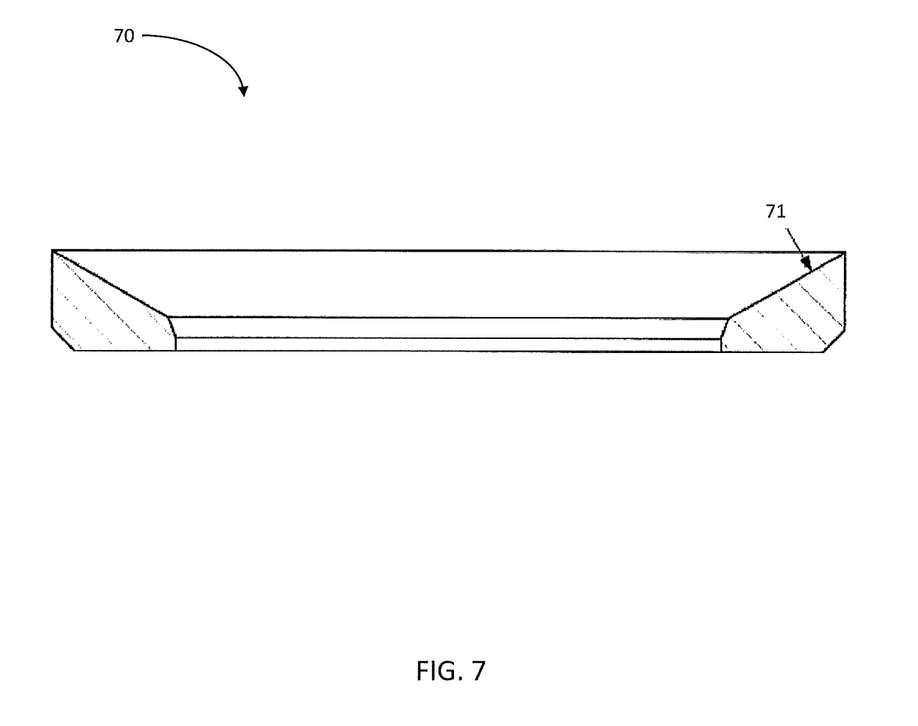
FIG. 7 is a cross-sectional view of a sintered cemented carbide inlay according to some embodiments.
Figure 8:
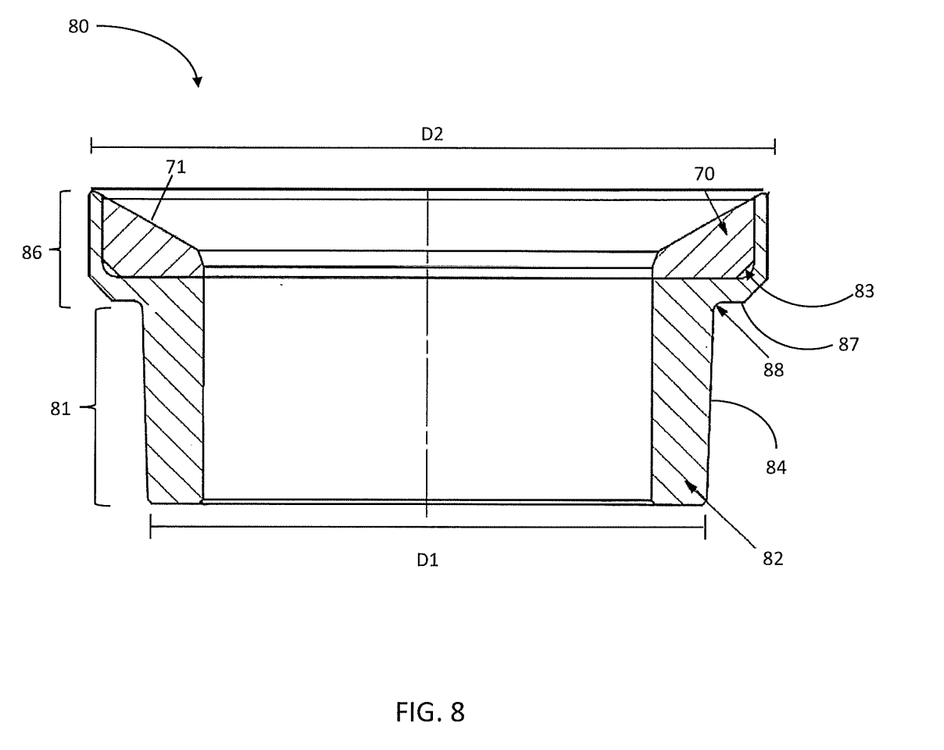
FIG. 8 is a cross-sectional view of valve seat comprising a sintered cemented carbide inlay coupled to an alloy body or casing according to some embodiments.

Alternatively, the frusto-conical valve mating surface can be provided as a sintered cemented carbide inlay coupled to a metal or alloy body, wherein the sintered cemented carbide has surface roughness ($R_a$) of 1-15 µm. FIG. 7 illustrates a sintered cemented carbide inlay according to some embodiments. The sintered cemented carbide inlay 70 comprises a frusto-conical valve mating surface 71. Sintered cemented carbide forming the inlay 70 can have any composition and/or properties described above. The sintered cemented carbide inlay can be coupled to a metal or alloy body or casing. The metal or alloy body can form the first section of the valve seat and a portion of the second section. FIG. 8 is a cross-sectional view of valve seat comprising a sintered cemented carbide inlay coupled to an alloy body or casing according to some embodiments. In the embodiment of FIG. 8, the alloy body 82 forms the first section 81 of the valve seat 80 for insertion into a fluid passageway of a fluid end. The alloy body 82 also forms a portion of the second section 86 and defines a recess 83 in which the sintered cemented carbide inlay 70 is positioned. As in FIG. 7, the sintered cemented carbide inlay 70 comprises a frusto-conical valve mating surface 71 having surface roughness of ($R_a$) of 1-15 µm. In some embodiments, $R_a$ of the valve mating surface 71 is 5-10 µm. The sintered cemented carbide inlay 70 can be coupled to the alloy body 82 by any desired means including brazing, sintering, hot isostatic pressing and/or press fit. In some embodiments, the inner annular surface of the alloy body in the second section 86 comprises one or more protrusions for engaging a groove on the perimeter of the sintered cemented carbide inlay 70. In some embodiments, the alloy body 82 can impart a compressive stress condition to the sintered cemented carbide inlay 70. The sintered cemented carbide inlay 70, for example, can exhibit compressive stress having a value selected from Table I above, in some embodiments. The alloy body 82 can be formed of any desired alloy including, but not limited to, steel and cobalt-based alloy. The alloy body 82 also provides a portion of the second section 86 having an outer diameter D2 greater than the outer diameter D1 of the first section 81. The outer diameter D1 may vary with taper of the outer surface 84 of the first section 81, in some embodiments. A curved intersection 88 exists at the transition of the first section 81 and the second section 86. Additionally, the larger outer diameter D2 of the second section 86 creates a shoulder 87. The shoulder 87 may have a construction as described in FIGS. 1-2 herein.

In another aspect, valve assemblies for use in fluid ends are provided. A valve assembly comprises a valve in reciprocating contact with a valve seat, the valve seat comprising a first section for insertion into a fluid passageway of the fluid end and a second section extending longitudinally from the first section. The second section has an outer diameter greater than the outer diameter of the first section and comprises a frusto-conical valve mating surface. The second section is also encased in a ring which imparts a compressive stress condition to the second section. In some embodiments, the second section is optionally encased in the ring, and the valve mating surface comprises sintered cemented carbide having surface roughness ($R_a$) of 1-15 μm. In other embodiments, the frusto-conical valve mating surface of the second section is provided as a sintered cemented carbide inlay coupled to a metal or alloy body, wherein the sintered cemented carbide has surface roughness ($R_a$) of 1-15 μm. In some embodiments, the metal or alloy body forms the first section of the valve seat and provides a recess for the sintered cemented carbide inlay in the second section. The valve seat can have any features, composition and/or properties described herein.

In a further aspect, fluid ends are described. A fluid end comprises a suction fluid passageway and a discharge fluid passageway. A valve assembly is positioned in at least one of the suction and discharge fluid passageways, the valve assembly comprising a valve in reciprocating contact with a valve seat. The valve seat comprises a first section for insertion into the suction or discharge fluid passageway and a second section extending longitudinally from the first section. The second section has an outer diameter greater than the outer diameter of the first section and comprises a frusto-conical valve mating surface. The second section is encased in a ring which imparts a compressive stress condition to the second section. In some embodiments, the second section is optionally encased in the ring, and the valve mating surface comprises sintered cemented carbide having surface roughness ($R_a$) of 1-15 μm. In other embodiments, the frusto-conical valve mating surface of the second section is provided as a sintered cemented carbide inlay coupled to a metal or alloy body, wherein the sintered cemented carbide has surface roughness ($R_a$) of 1-15 μm. In some embodiments, the metal or alloy body foul's the first section of the valve seat and provides a recess for the sintered cemented carbide inlay in the second section. The valve seat can have any features, composition and/or properties described herein. In some embodiments, the compressive stress condition of the first section is substantially equal to the compressive stress condition of the second section. In being substantially equal, compressive stress conditions of the first and second sections are within 10 percent of one another.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A valve seat comprising:
   a first section for insertion into a fluid passageway of a fluid end; and
   a second section extending longitudinally from the first section, the second section having an outer diameter greater than the outer diameter of the first section and including a frusto-conical valve mating surface comprising sintered cemented carbide having surface roughness ($R_a$) of 1-15 μm, wherein the first section and second section are formed of sintered cemented carbides of differing composition.

2. The valve seat of claim 1, wherein the sintered cemented carbide of the valve mating surface is mechanically worked.

3. The valve seat of claim 1, wherein the sintered cemented carbide of the valve mating surface is in the form of an inlay ring.

4. The valve seat of claim 1, wherein the sintered cemented carbide of the second section has higher hardness and/or wear resistance than the sintered cemented carbide of the first section.

5. The valve seat of claim 1, wherein the sintered cemented carbide of the second section has smaller average grain size than the sintered cemented carbide of the first section.

6. The valve seat of claim 1, wherein the sintered cemented carbide of the second section has lower metallic binder content than the sintered cemented carbide of the first section.

7. The valve seat of claim 1, wherein the second section comprises sintered cemented carbide having a hardness gradient.

8. The valve seat of claim 7, wherein the sintered cemented carbide of the valve mating surface has higher hardness than sintered cemented carbide 50 μm to 1 mm below the valve mating surface.

9. The valve seat of claim 2, wherein the valve mating surface has a blasted condition.

10. A valve assembly for use in a fluid end comprising:
    a valve in reciprocating contact with a valve seat, the valve seat comprising a first section for insertion into a fluid passageway of the fluid end and a second section extending longitudinally from the first section, the second section having an outer diameter greater than the outer diameter of the first section and including a frusto-conical valve mating surface comprising sintered cemented carbide having surface roughness ($R_a$) of 1-15 μm, wherein the first section and second section are formed of sintered cemented carbides of differing composition.

11. The valve assembly of claim 10, wherein the sintered cemented carbide of the valve mating surface is mechanically worked.

12. The valve assembly of claim 10, wherein the sintered cemented carbide of the valve mating surface is in the form of an inlay ring.

13. The valve assembly of claim 10, wherein the sintered cemented carbide of the second section has higher hardness and/or wear resistance than the sintered cemented carbide of the first section.

14. The valve assembly of claim 10, wherein the sintered cemented carbide of the second section has smaller average grain size than the sintered cemented carbide of the first section.

15. The valve assembly of claim 10, wherein the sintered cemented carbide of the second section has lower metallic binder content than the sintered cemented carbide of the first section.

16. The valve assembly of claim 10, wherein the second section comprises sintered cemented carbide having a hardness gradient.

17. The valve assembly of claim 16, wherein the sintered cemented carbide of the valve mating surface has higher hardness than sintered cemented carbide 50 µm to 1 mm below the valve mating surface.

18. The valve assembly of claim 11, wherein the valve mating surface has a blasted condition.

* * * * *